(12) United States Patent
Han et al.

(10) Patent No.: US 8,751,973 B2
(45) Date of Patent: Jun. 10, 2014

(54) DISPLAY METHOD AND SYSTEM FOR PORTABLE DEVICE USING EXTERNAL DISPLAY DEVICE

(75) Inventors: Yong Hee Han, Daegu (KR); Soon Jin Kim, Daegu (KR); Jae Gon Son, Buk-gu Daegu (KR); Ki Tae Kim, Gumi-si (KR); Seok Gon Lee, Gumi-si (KR)

(73) Assignee: Samsung Electronics Co., Ltd (KR)

( * ) Notice: Subject to any disclaimer, the term of this patent is extended or adjusted under 35 U.S.C. 154(b) by 726 days.

(21) Appl. No.: 11/642,833

(22) Filed: Dec. 21, 2006

(65) Prior Publication Data

US 2007/0271525 A1 Nov. 22, 2007

(30) Foreign Application Priority Data

May 18, 2006 (KR) ........................ 10-2006-0044555

(51) Int. Cl.
*G06F 3/048* (2013.01)
*G06F 3/14* (2006.01)

(52) U.S. Cl.
USPC .......................................... 715/864; 715/810

(58) Field of Classification Search
USPC ................................. 715/864, 810; 348/207.1
See application file for complete search history.

(56) References Cited

U.S. PATENT DOCUMENTS

| | | | |
|---|---|---|---|
| 5,528,285 A | 6/1996 | Morikawa et al. ............ 348/379 |
| 5,764,201 A | 6/1998 | Ranganathan | |
| 5,880,732 A * | 3/1999 | Tryding ........................ 715/810 |
| 6,305,016 B1 | 10/2001 | Marshall et al. ................. 725/41 |
| 6,651,044 B1 * | 11/2003 | Stoneman ........................ 706/10 |
| 6,937,841 B1 | 8/2005 | Guy et al. ...................... 434/350 |
| 7,038,662 B2 * | 5/2006 | Noguera ........................ 345/158 |
| 7,376,913 B1 * | 5/2008 | Fleck et al. ................... 715/864 |
| 7,451,409 B2 * | 11/2008 | Eizips ........................... 715/856 |
| 7,480,484 B2 * | 1/2009 | Nam ............................ 455/3.06 |
| 8,558,790 B2 * | 10/2013 | Kim ............................ 345/156 |
| 2001/0011992 A1 * | 8/2001 | Juen et al. ..................... 345/156 |
| 2002/0059637 A1 | 5/2002 | Rakib ............................ 725/119 |
| 2002/0080091 A1 * | 6/2002 | Acharya et al. ................ 345/2.1 |
| 2002/0090980 A1 * | 7/2002 | Wilcox et al. ................. 455/566 |
| 2004/0174395 A1 | 9/2004 | Liu | |
| 2004/0249962 A1 | 12/2004 | Lecomte ....................... 709/229 |
| 2005/0076309 A1 * | 4/2005 | Goldsmith ..................... 715/811 |
| 2005/0146621 A1 * | 7/2005 | Tanaka et al. ............... 348/211.2 |
| 2005/0239401 A1 * | 10/2005 | Nam ............................ 455/3.06 |
| 2006/0079214 A1 * | 4/2006 | Mertama et al. ............ 455/414.1 |
| 2006/0085753 A1 * | 4/2006 | Vance et al. .................. 715/753 |
| 2006/0103751 A1 * | 5/2006 | Lee ........................... 348/333.02 |
| 2006/0109240 A1 * | 5/2006 | Fu et al. ........................ 345/156 |
| 2007/0250613 A1 * | 10/2007 | Gulledge ...................... 709/223 |

FOREIGN PATENT DOCUMENTS

| | | |
|---|---|---|
| KR | 1020030084212 | 1/2003 |
| KR | 1020030084212 A | 11/2003 |
| KR | 1020030093879 A | 12/2003 |
| WO | WO 2005/040991 A2 | 5/2005 |

\* cited by examiner

*Primary Examiner* — Rashawn Tillery
(74) *Attorney, Agent, or Firm* — The Farrell Law Firm, P.C.

(57) ABSTRACT

A display system and method of a portable phone using an external display device are provided, in which application data is displayed, a user input information presentation mode is activated while the application data is displayed, and a user input information corresponding to a signal is presented on the application data, if the signal is input in the user input information presentation mode.

19 Claims, 5 Drawing Sheets

DISPLAY METHOD AND SYSTEM FOR PORTABLE DEVICE USING EXTERNAL DISPLAY DEVICE

CROSS REFERENCE TO RELATED APPLICATIONS

This U.S. non-provisional application claims the benefit under 35 U.S.C. §119(a) of Korean Patent Application No. 2006-0044555, which was filed in the Korean Intellectual Property Office on May 18, 2006, the entire disclosure of which is hereby incorporated by reference.

BACKGROUND OF THE INVENTION

1. Field of the Invention

The present invention relates to a portable device. More particularly, the present invention relates to a display system and method of a portable device using an external display device.

2. Description of the Related Art

Recent advances in wireless communications and mobile devices have made it possible for broad distribution of multimedia content such as digital music, image, video, and games over the Internet.

The technological advancements and rising usage of mobile communication have influenced people's everyday life dramatically. As a result of these technological advancements, mobile phones are becoming ever more popular and widely accepted for data communications as well as for conventional voice communications.

The success of mobile communication lies in the abilities to provide instant connectivity almost anytime and anywhere, and to provide various services such as wireless Internet access, Short Message Service (SMS), on-demand multimedia services, and the like.

Portable phones have been implemented with additional functions to enable use thereof as a personal scheduler or a data communication device with a computer as well as basic voice communication.

Recently, portable phones integrated with various digital devices such as image processors, virtual three-dimensional stereo sound modules, MP3 modules, camera modules, and the like have emerged onto the market.

Sometimes, the portable phones are named according to their additional functions, for example Internet phones, data communication phones, multimedia phones, health assistant phones, game phones, and the like.

More recently, portable phones equipped with a digital multimedia broadcasting (DMB) receiver emerged onto the market, thereby extending the range of entertainments available with portable phones.

Display modules of the portable phones have advanced considerably to an extent that supports the display of high quality motion pictures. However, the displays for the portable phones are limited to liquid crystal displays (LCDs) and limited in size for securing the portability of the phones.

In order to extend entertainment functions, recent portable phones may provide display output ports. By connecting the portable phone to a TV or other external display device, it is possible to overcome size limitations.

However, the conventional portable phone having a display output port provides only a function to expand the size of the screen to present an image provided by the portable phone, but does not support the display of information input by a user during the presentation of the image.

Accordingly, there is a need for an improved display method and system for a portable device for displaying information input by a user during a presentation of an image.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a display system and method for a portable device that are capable of improving utilization of the portable device.

Another aspect of exemplary embodiments of the present invention is to provide a display system and method for a portable device that are capable of presenting user's input information while a multimedia content is displayed, on an external display device.

Another aspect of exemplary embodiments of the present invention is to provide a display system and method for a portable device capable of displaying data input by a user in real time during presentation of multimedia content image with display-out function.

Another aspect of exemplary embodiments of the present invention is to provide a display system and method for a portable device capable of generating user input information in accordance with a spatial displacement of the portable device.

In accordance with one aspect of exemplary embodiments of the present invention, the above and other aspects are accomplished by a display method for a portable device. The display method for a portable device comprises displaying application data, activating a user input information presentation mode while the application data is displayed, and presenting on the application data, if a signal is input in the user input information presentation mode, a user input information corresponding to the signal.

In accordance with another aspect of exemplary embodiments of the present invention, the above and other aspects are accomplished by a display method for a portable device. The display method for a portable device comprises displaying application data on the external display, activating a user input information presentation mode while the application data is displayed, determining whether an event occurs in the user input information presentation mode, and presenting on the application data, if an event occurs, a user input information corresponding to the event.

In accordance with another aspect of exemplary embodiments of the present invention, the above and other aspects are accomplished by a display system for a portable device. The display system for a portable device includes a memory which stores an application for establishing a connection between the portable device and the external display and presenting application data and user input information and which stores the application data, a screen image processing unit which processes the user input information to be presented on the application data, and a controller which controls the portable device to operate in a user input information presentation mode, in which user input information is presented on the application data in real time, according to a mode selection input.

BRIEF DESCRIPTION OF THE DRAWINGS

The above and other objects, features and advantages of certain exemplary embodiments of the present invention will be more apparent from the following detailed description in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

In certain exemplary embodiments of the present invention, a display system and method for a portable phone are described, however, the present invention is not limited to the portable phone, but comprises various electronic devices having a display module. The electronic devices include cellular phones, DMB terminals, wired or wireless handsets, personal digital assistants (PDAs), smart phones, International Mobile Telecommunication 2000 (IMT-2000) terminals, Universal Mobile Telecommunication Service (UMTS) terminals, digital cameras, MP3 players, and the like.

Figure 1:
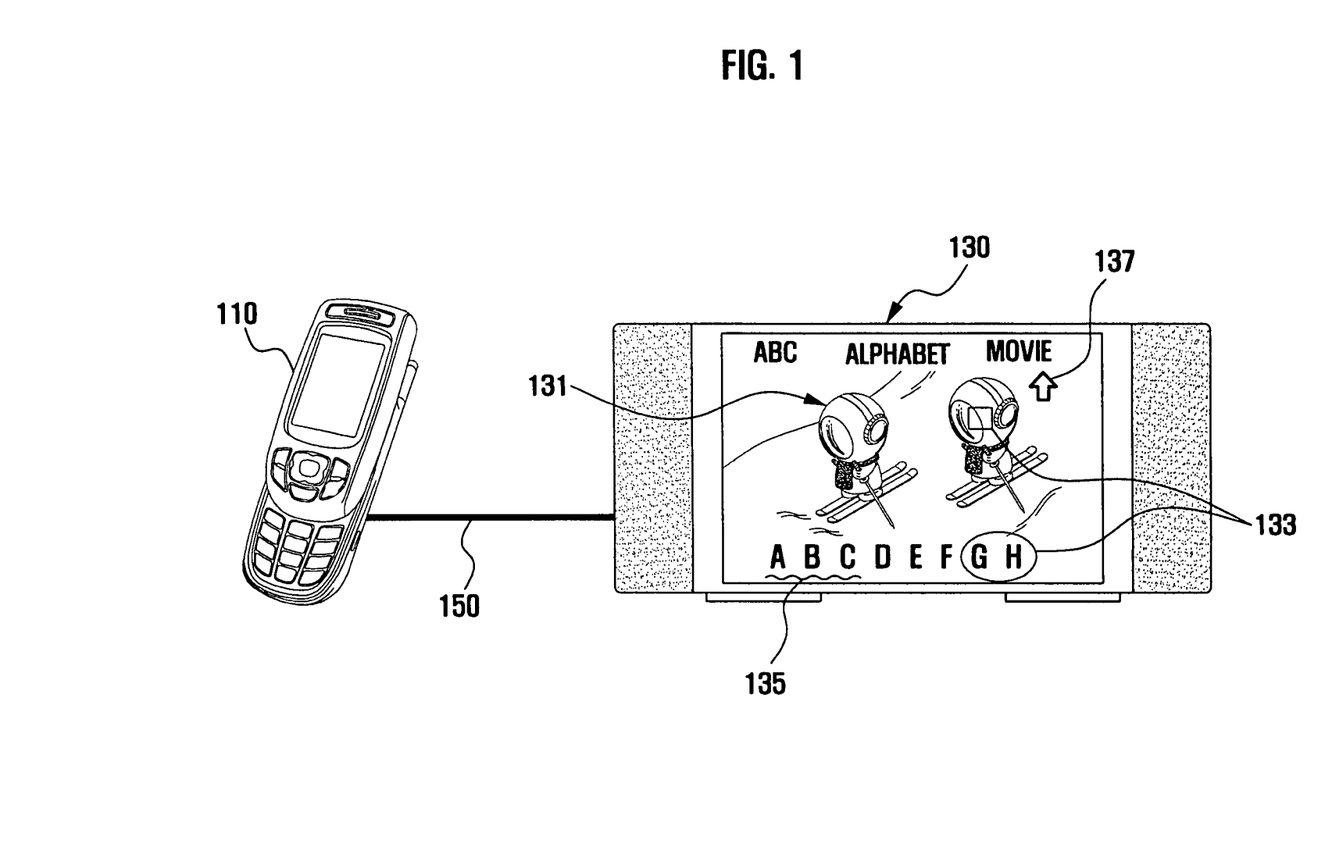
FIG. 1 is a schematic view illustrating a display system using a portable device according to an exemplary embodiment of the present invention.

FIG. 1 is a schematic view illustrating a display system using a portable phone according to an exemplary embodiment of the present invention.

Referring to FIG. 1, the display system according to an exemplary embodiment of the present invention includes a portable phone 110, an external display device 130, which can be a television (TV), a computer monitor or other display panels, and a connection interface 150 for interfacing the portable phone 110 with the external display device 130.

The portable phone 110 processes video signals to be suitable for the external display device 130 and transmits the processed signals to the external device 130 through the connection interface 150. While the processed signals, as a video image 131, are presented on a screen of the external display device 130, the portable phone 110 allows a user to input information such that the real time user input information is shown with the video image 131 on the screen of the external display device 130.

The video image 131 can be a text, a motion or still picture taken by a camera, a multimedia message, a game image, a presentation document, a DMB image, or other type of images provided with additional functions. The real time user input information includes objects such as a diagram 133, lines 135, and pointers 137 drawn by the user to be combined with the video image.

The real time user input information can be input by manipulating function keys activated when the portable phone 110 enters the user input mode. For example, the function keys are linked for a line drawing function, diagram drawing function, and point or character input function.

The portable phone 110 presents the real time user input information on the video image through the external display device 130, that is, the real time user input information is overlaid on the video image.

The external display device 130 displays the real time user input information received from the portable phone 110 such that the user information is overlaid on the video image. The external display device 130 can be a TV, a projector screen, or a computer monitor.

The connection interface 150 interfaces the portable phone with the external display device 130. The connection interface can support wired and/or wireless connection between the portable phone 110 and the external display device 130.

Figure 2:
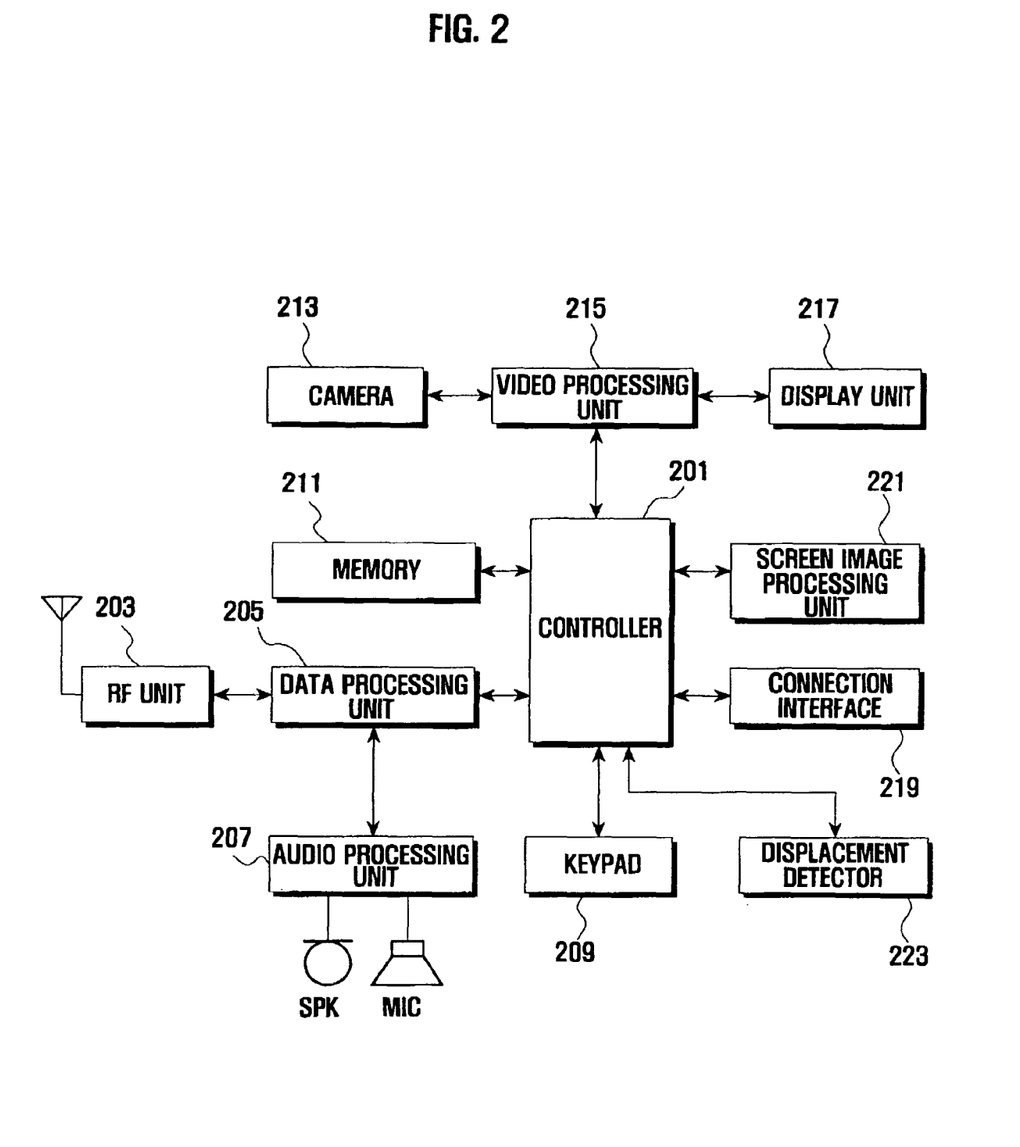
FIG. 2 is a block diagram illustrating a configuration of the portable device of the display system in FIG. 1.

FIG. 2 is a block diagram illustrating a configuration of the portable phone of the display system in FIG. 1.

Referring to FIG. 2, the portable phone 110 includes a controller 201, a radio frequency (RF) unit 203, a data processing unit 205, an audio processing unit 207, a keypad 209, a memory 211, a camera 213, a video processing unit 215, a display unit 217, a connection interface 219, a screen image processing unit 221, and a displacement detector 223.

The elements of the portable phone 110 can be classified into an input means, a processing means, a storage means, an output means, and a communication means.

The input means includes the audio processing unit 207, the keypad 209 for enabling the user to input alphanumeric data, and the camera 213 for taking a picture. If the display unit 217 is implemented as a liquid crystal display (LCD) supporting a touchscreen function, the display unit 217 can be included in the input means. The input means is responsible for taking various data such as voice data, alphanumeric data, and video data through the elements constituting the input means.

The processing means converts analog signals input through the camera 213 into digital signals. In an exemplary implementation supporting DMB service, the processing means includes the video processing unit 215 for processing the video signals received through a DMB receiver, the data processing unit 205 for processing the sound data from the audio processing unit 207 and the alphanumeric data input through the keypad 209, the controller 201 for controlling the elements constituting the portable phone, the screen image processing unit 221 for outputting application data to the external display device 130, and the displacement detector 223 for detecting a spatial displacement of the portable phone 110 and outputting a real time user input information matching the spatial displacement of the portable phone to the external display device 130. The processing means further includes a DMB receiver (not shown) for separating audio and video signals and data signals from the received DMB signals, and decodes the signals.

The storage means stores the user data such as text document, pictures taken by the camera 213, DMB data, and real time user input information received through the input means, and the application programs for controlling the interoperation with the external display device 130 and displaying the real time user input information on the application data. The storage means includes the memory 211.

The output means includes the display unit 217 for displaying the real time user input information as well as the application data requested by the user, and the audio processing unit 207 for outputting the audio data to the outside. That is, the output means is responsible for displaying the application data input through the input means or stored in the storage means in accordance with the user instruction.

The communication means includes the RF unit 203 which communicates with a web server through at least an antenna. The communication means also includes the connection interface 219 for connecting to other external devices.

The RF unit 203 can support various types of communication services such as cellular or other wireless communications. The RF unit 203 includes a RF transmitter for up-converting and amplifying the signal to be transmitted and a RF receiver for low-noise amplifying and down-converting the received signal.

The data processing unit 205 includes a means for encoding and modulating the signal to be transmitted through the RF unit 203 and a means for demodulating and decoding the signal received through the RF unit 203.

The audio processing unit 207 processes the audio signal from the data processing unit 205 to be output through a speaker and transfers the audio signal input through a microphone to the data processing unit 205.

The keypad 209 includes a plurality of alphanumeric keys for enabling the user to input numbers and letters and various function keys allowing the user to input commands for operating corresponding functions. The keypad 209 also enables the user to input information such that the real time user input information is displayed on the application data presented through the external display device 130.

The memory 211 includes a program memory and a data memory. The program memory stores programs for controlling the general operations of the portable phone and application programs for controlling the operations related to the external display device 130. The memory 211 stores the screen data in which the real time user input information is overlaid on the application data displayed through the external display device 130. The real time user input information and the application data can be stored separately such that the screen data can be edited or stored in a form of flattened screen data.

The data memory temporarily stores the data generated during the operations of the programs and a database for arranging the data in the form of a table.

The application program enabling the application data and the real time user input information to be projected on the display unit 217 and on the external display device 130 includes a connection establishment module for controlling the connection between the portable phone 110 and the external display device 130 in response to a user request; an initialization module for displaying basic user data on the external display device 130; a presentation module for presenting the application data, menu items for user manipulation, and real time user input information; a program module for controlling input and presentation of the real time user input information in response to a request through the keypad; a program module for controlling input and presentation of the real time user input information in response to a request through the displacement detector 223; a program module for controlling such that the real time user input information is overlaid on the application data on the display unit 217 or the external display device 130; and a program module for storing the application data and the real time user input information as a combined screen by flattening the real time user input information onto the application data.

The controller 201 controls the overall operations of the portable phone 110, that is, the cooperation of data processing unit 205, keypad 209, memory 211, video processing unit 215, connection interface 219, screen image processing unit 221, and displacement detector 223. In addition, the controller 201 controls setting up of a real time user input information presentation mode in response to a mode selection command input through the keypad 209 by the user's key manipulation for entering the real time user input information presentation mode.

For example, the controller 201 switches the operation mode of the portable phone 110 from a voice communication mode to a display out mode, and then enters the real time user input information presentation mode according to the user key manipulations.

The controller 201 controls establishing a connection with an external display device 130 and presenting of the application data generated by the applications installed in the portable phone 110 through the external display device 130. The controller 201 controls presenting of the real time user input information on the application data. In addition, the controller 201 controls storing of the application data and the real time user input information as a combined screen image.

When the camera 213 takes a picture, the camera 213 receives analog signals. The signal processing unit 215 converts the analog signals from the camera into image signal such that the image signal is processed to be appropriate for the display unit 217.

The video processing unit 215 processes the application data image and real time user input information-overlaid application data image, and menu screen image to be suitable for the display unit 217, and then transmits the processed images to the display unit 217.

The video processing unit 215 also overlays the real time user input information on the application data according to the user's manipulation in the menu screen image to be presented on the display unit 217. The video processing unit 215 also has a compression/decompression function on the video data.

The display unit 217 presents the video data output from the video processing unit 215. The display unit 217 also presents the application data and the real time user input information simultaneously in an overlaid manner under the control of the controller 201. In addition, the display unit 217 can present the menu screen while the application data image is displayed according to the user's request.

The connection interface 219 interfaces the portable phone 110 with external devices. The connection interface 219 includes a wire connection interface for connecting the portable phone 110 with the external devices by means of a data cable, a TV-out cable, and a connector. The connection interface 219 also includes a wireless connection interface for connecting the portable phone 110 with the external devices by means of infrared, Bluetooth, or Radio Frequency Identification (RFID).

The screen image processing unit 221 processes a user input signal such that the real time user input information is presented over the application data displayed on the external display device 130.

If a user inputs request to present an object such as a line, diagram, character, or pointer by a key input while an application data image is presented on the external display device 130, the screen image processing unit 221 identifies an instruction corresponding to the key input and executes the instruction such that an object corresponding to the key input is presented, as the real time user input information on the application data image.

In addition, the screen image processing unit 221 can detect a spatial displacement of the portable phone 110 by means of a sensor when the portable phone 110 is in a sensor based user input mode. In the sensor based user input mode, the screen image processing unit 221 recognizes a specific spatial displacement of the portable phone 110 as an instruction to present an object corresponding to the spatial displacement is as the real time user input information on the application data image, and then executes the instruction to present the object.

The displacement detector 223 can be implemented with at least one of an acceleration sensor and a gyro sensor. For example, in order to convert analog signals generated by the acceleration sensor and the gyro sensor into digital signals, an analog/digital converter is required. The displacement detector 223 detects a spatial displacement of the portable phone 110 by means of the acceleration sensor and/or the gyro sensor and generates a corresponding spatial displacement signal.

If the portable phone 110 supports a DMB service, the portable phone 110 distinguishes satellite DMB signals and terrestrial DMB signals. In order to support DMB service, the portable phone includes a DMB receiver. The DMB receiver includes a satellite DMB module and/or a terrestrial DMB module.

Figure 3A:
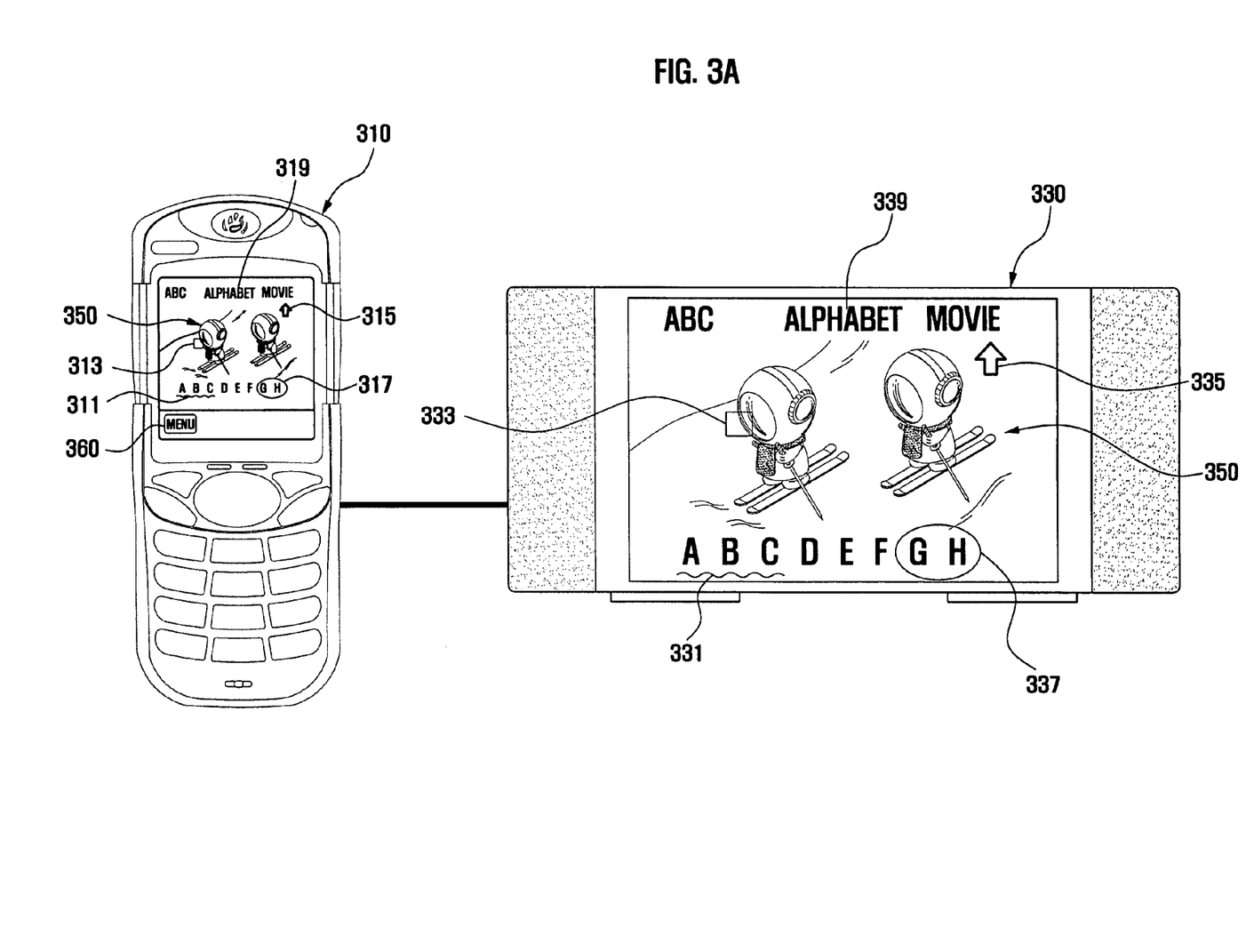
FIG. 3A is a schematic view illustrating a display system using a portable device according to an exemplary embodiment of the present invention.
Figure 3B:
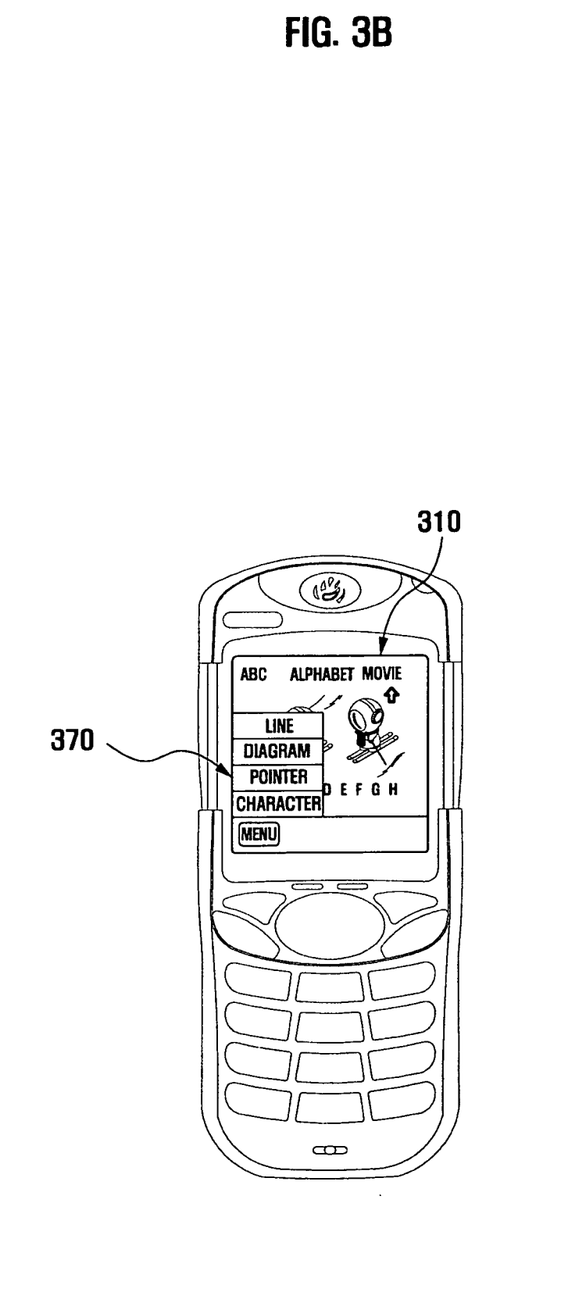
FIG. 3B is an enlarged view illustrating the portable device of the display system of FIG. 3A.

FIG. 3A is a schematic view illustrating a display system using a portable phone according to an exemplary embodiment of the present invention, and FIG. 3B is an enlarged view illustrating the portable phone of the display system of FIG. 3A.

Referring to FIGS. 3A and 3B, the reference numeral 310 denotes a portable phone and the reference numeral 330 denotes an external display device. The external display device can be a TV, a projector screen, and a computer monitor.

If the portable phone 310 is connected to the external display device 330 through a connection interface and an application is operated by a user, an application data image 350 is presented on display screens of the portable phone 310 and the external display device 330 simultaneously. The application data image 350 also can be displayed on a display screen of at least one of the portable phone 310 and the external display device 330 according to a user's setting.

The application data image 350 can be a text image and a still or motion picture image according to the current operation application. The connection interface supports a wire and wireless connection with external devices.

If a key input for activating a real time user input information presentation mode is detected while the application data image is presented on the screen of the external display device 330, a menu window 370 appears on the display screen of the portable phone 310. The key for activating the real time user input information presentation mode can be a predetermined function key, a soft key, or a hot key.

For example, a menu button 360, which is presented on the display screen of the portable phone 310, is selected by the user's key manipulation while the application data image is presented on the screen of the external display device 330, so that a menu window 370 of FIG. 3B appears on the display screen of the portable phone 310. For example, the menu window is presented on the display screen of the portable phone 310, and not on the screen of the external display device 330. However, the menu window can be presented simultaneously on the display screens of both the portable phone 310 and the external display device 330, according to the user's setting.

The menu window 370 shows menu items for the drawing line, diagram, pointer, and character.

If the item 'line' is selected from the menu window 370 by a user's key manipulation, the portable phone 310 enters a line drawing mode.

In the line drawing mode, the portable phone 310 moves a pointer at a position on the display screen and draws a line, an example of which is shown in FIG. 3A as 311 and 331, according to the user's key manipulation, such that the line is overlaid on the currently displayed application data 350 in the external display device 330. In order to draw a line, the key manipulation is performed with at least one of a direction key, an enter key, a selection key, and another function key.

For example, the real time user input information is presented on the display screens of both the portable phone 310 and the external display device 330. However, the presentation of the real time user input information also can be performed on one of the display screens of the portable phone 310 and the external display device 330, according to the user's setting.

In the case of line drawing, for example, the pointer 315 (335) can be moved by a direction key manipulation and be located at a user's intended point by selection key input. After the pointer 315 (335) is located at the user's intended initial point on the display screen, a line is drawn, with a predetermined manipulation, from the initial point to an end point at which the selection key input is performed. For example, the movement of the pointer 315 (335) is presented on the display screen of the portable phone 310. However, the movement of the pointer 315 (335) can be presented on the display screens of both the portable phone 310 and the external display device 330 simultaneously.

In the case that the 'diagram' item is selected from the menu window 370 by a user's key manipulation, the portable phone 310 enters a diagram drawing mode.

In the diagram drawing mode, the portable phone 310 moves a pointer at a position on the display screen and draws a diagram, examples of which are shown in FIG. 3A as 313 (333) and 317 (337), according to the user's manipulation, such that the diagram is overlaid on the currently displayed application data 350 in the external display device 330. In order to draw a diagram, the key manipulation is performed with at least one of a direction key, an enter key, a selection key, and another function key.

In the case of diagram drawing, for example, the pointer 315 (335) can be moved by a direction key manipulation and be located at a user's intended point by selection key input. After the pointer 315 (335) is located at the user's intended initial point on the display screen, a diagram is drawn, with a predetermined manipulation, from the initial point to an end point at which the selection key input is performed. Preferably, the movement of the pointer 315 (335) is presented on the display screen of the portable phone 310. However, the movement of the pointer 315 (335) can be presented on the display screens of both the portable phone 310 and the external display device 330 simultaneously.

If the 'pointer' item is selected from the menu window 370 by a user's key manipulation, the portable phone enters a pointer operation mode.

In the pointer operation mode, the portable phone 310 moves a pointer at a position on the display screen. The pointer, shown in FIG. 3A as 315 (335), is moved so as to be presented on the application data at a user's intended position. In order to move the pointer, the key manipulation is performed with at least one of a direction key, an enter key, a selection key, and another function key.

In the case of pointer movement, for example, the pointer 315 (335) can be moved by a direction key manipulation and be located at a user's intended point by a selection key input. When the selection key input is performed, an event effect occurs for notifying the location of the pointer 315 (335).

For example, the movement of the pointer 315 (335) is presented on the display screen of the portable phone 310. However, the movement of the pointer 315 (335) can be presented on the display screens of both the portable phone 310 and the external display device 330 simultaneously.

If the 'character' item is selected from the menu window 370 by a user's key manipulation, the portable phone 310 enters a character input mode.

In the character input mode, the portable phone 310 moves a pointer to a position on the display screen at which the user present characters, such that the characters, examples of which are shown in FIG. 3A as 319 (339), input by a user's key manipulation is overlaid on the displayed application data 350 in the external display device 330. In order to present characters, the key manipulation is performed with at least one of a direction key, an enter key, a selection key, and another function key.

For example, the characters 319 (339) as the real time user input information are presented on the display screens of both the portable phone 310 and the external display device 330. However, the characters 319 (339) can be presented on the display screen of one of the portable phone 310 and the external display device 330 according to the user's setting.

In the case of character input, for example, the pointer 315 (335) can be moved by a direction key manipulation and be located at a user's intended point by selection key input. After the pointer 315 (335) is located at the user's intended initial point on the display screen, characters are presented with corresponding key inputs. The movement of the pointer 315 (335) is presented on the display screen of the portable phone 310. However, the movement of the pointer 315 (335) can be presented on the display screens of both the portable phone 310 and the external display device 330 simultaneously.

Although the real time user input information is presented by the user's key manipulation, however, the presentation of the real time user input information can be performed by detecting a spatial displacement of the portable phone using a displacement detectable sensor, such as a gyro sensor. In the case of spatial displacement based presentation of the real time user input information, the portable phone generates control signals corresponding to the spatial displacement of the portable phone sensed by the displacement sensor.

Figure 4:
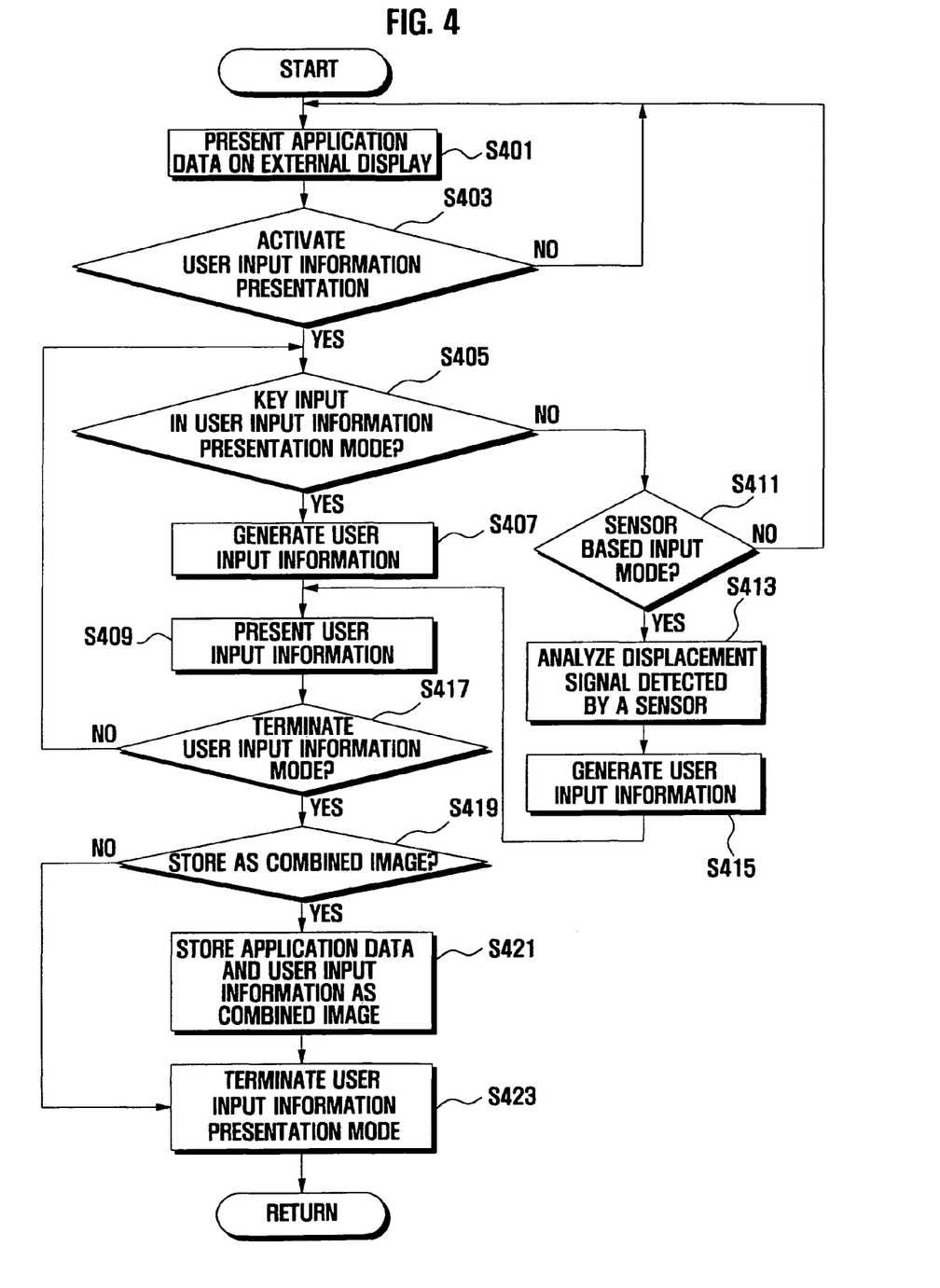
FIG. 4 is a flowchart illustrating a display method of a portable device using an external display device according to an exemplary embodiment of the present invention.

FIG. 4 is a flowchart illustrating a display method of a portable phone using an external display device according to an exemplary embodiment of the present invention.

Referring to FIG. 4, once the portable phone is connected to an external display device through a connection interface, the portable phone transmits an application data image to the external display device such that the application data image is presented on a display screen of the external display device (S401).

While the application data image is presented on the display screen of the external display device, the portable phone determines whether a key input is performed for activating a real time user input information presentation mode (S403).

If a key input for activating the real time user input information presentation mode is detected, the portable phone activates the real time user input information presentation mode and determines whether a key input is performed while in the real time user input information presentation mode (S405).

If a key input is detected in the real time user input information presentation mode, the portable phone analyzes the key input and generates real time user input information corresponding to the key input (S407) and then presents the real time user input information on the application data image (S409). The real time user input information can be presented through the external display device or through the displays of both the portable phone and the external display device.

At step S403, if key input for activating the real time user input information presentation mode is not detected, the portable phone determines whether a sensor based input mode operates (S411).

If no sensor based input mode is operating, the portable phone repeats step S401.

If it is determined that the real time user input information presentation mode is operating with a sensor based user input mechanism, the portable phone receives and analyzes a displacement signal detected by a sensor (S413) and then generates real time user input information corresponding to the displacement signal (S415). Subsequently, the portable phone presents the real time user input information on the application data image (S409).

After presenting the real time user input information on the application data image, the portable phone determines whether a key input is performed for terminating the real time user input information presentation mode (S417). If a key input for terminating the real time user input information presentation mode is detected, the portable phone determines whether a key input is performed for storing the application data image with the real time user input information as a combined image (S419).

If key input for storing the application image with the real time user input information is not detected, the portable phone terminates the real time user input information presentation mode without saving the application data image overlaid by the real time user input information (S423).

If a key input for storing the application data image with the real time user input information is detected, the portable phone stores the application data image with the real time user input information as a combined image (S421) and then terminates the real time user input information presentation mode (S423).

As described above, the display method and system for a portable phone according to exemplary embodiments of the present invention enable an application data image to be presented on a large display screen of an external display device, resulting in improvement in data legibility.

In addition, the display method and system for a portable phone according to exemplary embodiments of the present invention enable presentation of data, input in real time by a user on an application data image, presented through an external display device having a large display screen. Thereby, the portable phone can be utilized as a remote pointer.

While the has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A display method of a portable device having a sensor, an internal display and connected to an external display, comprising:
   displaying an application data on the external display;
   activating a user input information presentation mode, while the application data is displayed;
   determining whether the sensor is operating;
   analyzing, when the sensor is operating, a displacement signal generated by the sensor, wherein the displacement signal corresponds to a spatial displacement of the portable device;
   generating user input information corresponding to the displacement signal, wherein the user input information comprises at least one of a line drawing, a diagram drawing and a character input; and presenting the user input information overlaid with the application data on the application data on the external display.

2. The display method of claim 1, further comprising storing the application data and the user input information in a memory of the portable device.

3. The display method of claim 2, wherein the application data and the user input information are stored separately.

4. The display method of claim 1, wherein the application data comprises at least one of a text document, a still picture, and a motion picture.

5. The display method of claim 1, wherein the application data is displayed on at least one of the internal display and external display.

6. The method of claim 1, further comprising processing the user input information presented on the application data.

7. The display method of claim 1, further comprising:

determining whether an input for storing the application data and the user input information as a combined image is performed; and storing the combined image, if the input for storing the application data and the user input information is performed.

8. The method of claim 1, further comprising storing an application for establishing a connection between a portable device and the external display, and the application data.

9. A display system of a portable device having an internal display and connected to an external display, the display system comprising:

a displacement detector for detecting a spatial displacement of the portable device, wherein the spatial displacement is analyzed as user input information;

a memory for storing application data and an application configured to establish connection between the portable device and the external display;

a screen image processing unit for processing the user input information presented on the application data; and a controller for:

controlling the portable device to display the application data on the external display;

activating a user input information presentation mode, while the application data is displayed;

determining whether the displacement detector is operating, analyzing, when the sensor is operating, a displacement signal generated by the detector, wherein the displacement signal corresponds to a spatial displacement of the portable device;

generating the user input information corresponding to the displacement signal, wherein the user input information comprises at least one of a line drawing, a diagram drawing and a character input; and controlling the portable device to present the user input information overlaid with the application data on the application data on the external display.

10. The display system of claim 9, wherein the controller controls the memory to store the application data and the user input information.

11. The display system of claim 10, wherein the application data and the user input information are stored separately.

12. The display system of claim 9, further comprising a keypad comprising a plurality of keys for performing key inputs.

13. The display system of claim 9, further comprising a connection interface for interfacing the portable device with the external display.

14. The display system of claim 13, wherein the connection interface comprises at least one of a wire interface module and a wireless interface module.

15. The display system of claim 9, wherein the application data comprises at least one of a text document, a still picture, and a motion picture.

16. The display system of claim 9, wherein the application data is displayed on at least one of the internal display and external display.

17. The display system of claim 9, wherein the controller is adapted to determine whether an input for storing the application data and the user input information as a combined image is performed, and to store the application data and the user input information as a combined image in the memory, if the input for storing the application data and the user input information is performed.

18. A display method of a portable device having an internal display and connected to an external display, comprising:

displaying application data on the external display;

activating a user input information presentation mode, while the application data is displayed, wherein the user input information is presented overlaid on the application data;

determining whether an event occurs in the user input information presentation mode, and if the event does not occur, determining whether the event is detected by a sensor, and generating an event signal corresponding to the event, wherein the event signal includes a spatial displacement between the portable device and the external display;

generating the real time user input information corresponding to the spatial displacement;

presenting on the application data the real time user input information corresponding to the displacement signal, if the signal is input in the user input information presentation mode; and storing in a memory of the portable device the application data and the user input information, wherein the application data and the user input information are stored separately.

19. A display system of a portable device having an internal display and connected to an external display, the display system comprising:

a displacement detector for detecting a spatial displacement between the portable device and the external display, wherein the spatial displacement is analyzed as user input information;

a memory for storing an application for establishing connection between the portable device and the external display, presenting application data and user input information, wherein the user input information is presented overlaid on the application data, and storing the application data, wherein the application data and the user input information are stored separately in the memory;

a screen image processing unit for processing the user input information presented on the application data; and a controller for controlling the portable device to operate in a user input information presentation mode, in which user input information is presented on the application data in real time according to a mode selection input, and wherein the controller is adapted to determine whether an event occurs in the user input information presentation mode, and, if the event does not occur, to determine whether the event is detected by a sensor, and to generate an event signal corresponding to the event, wherein the event signal includes the spatial displacement, and to generate the real time user input information corresponding to the spatial displacement.

\* \* \* \* \*